Patented Feb. 19, 1952

2,585,979

UNITED STATES PATENT OFFICE 2,585,979

PROCESS FOR THE MANUFACTURE OF QUATERNARY SALTS OF PYRIMIDYL-AMINO QUINOLINES

Charles Henry Vasey, Blackley, Manchester, England, assignor to Imperial Chemical Industries Limited, a corporation of Great Britain No Drawing. Application November 3, 1949, Serial No. 125,385. In Great Britain November 5, 1948

4 Claims. (Cl. 260—256.4)

This invention relates to a process for the manufacture of quaternary salts and more particularly it relates to a process for the manufacture of quaternary sulphates and sulphonates derived from pyrimidylaminoquinolines and cinnolines which are useful as trypanocidal agents in chemotherapy.

The quaternary salts with the manufacture of which this invention is concerned may be represented by the formula Pq—NH—Qq wherein P stands for a 2-, 4- (or 6-) amino- or lower alkylamino-substituted pyrimidine nucleus which is attached to the linking —NH— group at another of the 2-, 4-, (or 6-) positions and may be further substituted in the remaining 2-, 4- (or 6-) position by a lower alkyl group, an amino group or a lower alkylamino group, Q stands for a quinoline or cinnoline nucleus which is substituted in the 4-position by an amino group or by a lower alkylamino group and which may be further substituted by a lower alkyl group or groups, and wherein the symbols q indicate that the preceding nuclei P and Q respectively are present in the form of their quaternary sulphates and sulphonates.

According to the invention we manufacture the said quaternary sulphates and sulphonates by a process which comprises heating the corresponding quaternary salt of a halogen acid with a lower alkyl ester of sulphuric acid or a sulphonic acid.

Preferably the reaction is carried out in an inert organic liquid medium which has a boiling point substantially higher than that of the lower alkyl halide which is formed as a by-product. The lower alkyl halide is then distilled from the reaction mixture as it is formed.

One of the more convenient processes for the manufacture of quaternary salts of this kind is by interaction of the compound Pq halogen with the quinoline or cinnoline derivative NH2Qq. However by this process there is obtained the final quaternary salt necessarily at least in part in the form of the salt of a halogen anion and in many instances, for some chemotherapeutic purposes, it is found that these quaternary halides, being relatively sparingly soluble, are less suitable than are the quaternary sulphates and sulphonates which are frequently more soluble. Thus one of the advantages of the present invention is that it provides a means by which the quaternary halides may be converted into the more soluble quaternary salts.

Lower alkyl esters of sulphuric and sulphonic acids which may be used in the process of the present invention include for example, dimethyl sulphate, diethyl sulphate, methyl p-toluene sulphonate and methyl methanesulphonate.

Thus the expression "quaternary sulphates" as used hereinbefore includes especially the quaternary alkyl sulphates.

The invention is illustrated but not limited by the following examples in which the parts are by weight.

Example 1

6.2 parts of 4-amino-6-(2'-amino-6'-methylpyrimidyl-4'-amino) - quinaldine 1:1' - dimethochloride dihydrate are suspended in a mixture of 48 parts of nitrobenzene and 20 parts of toluene. The mixture is distilled and the condensed distillate is returned to the distillation vessel after separation of water therefrom. This is continued until the distillate is free from water. 10 parts of toluene are then distilled and the residue is cooled to below 100° C. 4.15 parts of dimethyl sulphate are then added and the mixture is heated and agitated at 95–100° C. for 6 hours, i. e. until no more methyl chloride is evolved and no chloride remains in the reaction mixture. It is then cooled to 40° C. and filtered. The solid residue is washed with 5 parts of methanol and is then mixed with 60 parts of methanol and heated and agitated under reflux until homogeneously dispersed. 0.4 part of 10% aqueous sodium carbonate solution is added slowly until a sample of the dispersion diluted with water has pH 6. The mixture is then cooled to room temperature, filtered and the solid residue is dried. It consists of 4-amino-6-(2'-amino-6'-methylpyrimidyl-4'-amino) - quinaldine 1:1'-di-(methomethyl sulphate), M. P. 265–6° C.

Example 2

6.2 parts of 4-amino-6-(2'-amino-6'-methylpyrimidyl-4'-amino) - quinaldine 1:1'-dimethochloride dihydrate are suspended in a mixture of 40 parts of nitrobenzene and 20 parts of toluene. The mixture is distilled and the condensed distillate is freed from water and returned to the distillation vessel. This process is continued until the distillate is free from water. 10 parts of toluene are then distilled and the suspension is cooled below 100° C. 5.8 parts of methyl p-toluenesulphonate are then added and the mixture is heated and agitated at 140–150° C. for 4 hours. It is then cooled and filtered and the solid residue is washed with acetone, and crystallised from a mixture of 200 parts of methanol and 10 parts of water. There is obtained 4-amino-6-(2'-amino-6'-methylpyrimidyl-4'-amino)-quinaldine 1:1'-di-(metho-p-toluenesulphonate) dihydrate as colourless crystals, M. P. 338–9° C.

*Example 3*

15.5 parts of 4-amino-6-(2'-amino-6'-methylpyrimidyl-4'-amino)-quinaldine 1:1'-dimethochloride dihydrate are suspended in a mixture of 180 parts of nitrobenzene and 200 parts of toluene. The mixture is distilled and the condensed distillate is freed from water and returned to the distillation vessel. This process is continued until the distillate is free from water. Then 100 parts of toluene are distilled and the residue is cooled to below 100° C. 4 parts of methyl methanesulphonate are then added and the mixture is heated and agitated at 130–140° C. for 2 hours. It is then cooled and filtered and the solid residue is washed with 50 parts of methanol. It is then heated under reflux with 150 parts of methanol and filtered hot. The solid residue consists of 4-amino-6-(2'-amino-6'-methylpyrimidyl-4'-amino)-quinaldine 1:1'-di-(methomethanesulphonate), M. P. 319–325° C.

*Example 4*

60 parts of 4-amino-6-(2'-amino-6'-methylpyrimidyl-4'-amino)-quinaldine 1:1'-dimethiodide dihydrate is mixed with 440 parts of nitrobenzene and 180 parts of toluene and is distilled. The condensed distillate is freed from water and returned continuously to the distillation vessel. The process is continued until all water is removed. 70 parts toluene are then distilled and 28 parts of dimethylsulphate are added and the mixture is heated at 140–150° C. for 30 minutes. The mixture is then cooled and filtered and the solid residue is washed with acetone. There is obtained 4-amino-6-(2'-amino-6'-methylpyrimidyl-4'-amino)quinaldine 1:1'-dimethomethylsulphate, M. P. 266–8° C.

*Example 5*

2.1 parts of 4-amino-6-(2'-amino-6'-methylpyrimidyl-4'-amino)-quinaldine 1:1'-dimethochloride dihydrate, 20 parts of nitrobenzene and 10 parts of toluene are distilled together and the distillate is freed from water and returned to the distillation vessel. This is continued until no more water distils. 5 parts of toluene are then distilled off and the mixture is cooled and 1.7 parts of diethyl sulphate are added. The mixture is then heated and stirred at 135–145° C. for 4 hours, cooled and filtered. The solid is washed with nitrobenzene, then with ethyl acetate and dried. It is 4-amino-6-(2'-amino-6'-methylpyrimidly-4'-amino)-quinaldine 1:1'-di(methoethylsulphate), M. P. 222–223° C. (decomp.).

*Example 6*

9.5 parts of 4-amino-6-(2'-amino-6'-methylpyrimidyl-4'-amino)quinaldine dimethochloride and 75 parts of methyl p-toluenesulphonate are stirred and heated together at 130–135° C. for 1 hour. The mixture is then cooled and filtered. The solid is washed with benzene and dried at 50° C. It is then crystallised from wet methanol and there is obtained the sesquihydrate of 4-amino-6-(2'-amino-6'-methylpyrimidyl-4'-amino)quinaldine 1:1'-di-(metho-p-toluenesulphonate), M. P. 331–332° C. (decomp.).

*Example 7*

A mixture of 0.7 part of 6-(2'-amino-6'-methylpyrimidyl-4'-amino)-4-methylaminoquinaldine 1:1'-dimethochloride, 20 parts of nitrobenzene and 10 parts of benzene is stirred and heated to 170° C., then it is cooled to below 100° C. and 0.5 part of dimethyl sulphate is added. The mixture is stirred and heated at 130–140° C. for 40 minutes, then cooled and filtered. The solid is washed with nitrobenzene and then with ethyl acetate, and dried. It is 6-(2'-amino-6'-methylpyrimidyl-4'-amino)-4-methylaminoquinaldine 1:1'-di-(methomethylsulphate) which, crystallised from wet methyl alcohol forms a dihydrate, M. P. 299–302° C. (decomp.).

*Example 8*

3.7 parts of 4-amino-6-(2'-aminopyrimidyl-4'-amino)-quinoline 1:1'-dimethochloride trihydrate, 30 parts of nitrobenzene and 15 parts of toluene are stirred and distilled at 170° C. for 3 hours and the distillate is freed from water and returned to the mixture. Toluene is then distilled off and the mixture is cooled to 100° C. 2.7 parts of dimethyl sulphate are added and the mixture is stirred at 110° C. for 2 hours. It is then cooled and acetone is added, and the solid is filtered off and washed with acetone. It is then crystallised from aqueous methanol giving 4-amino-6-(2'-aminopyrimidyl-4'-amino)quinoline 1:1'-di(methomethylsulphate), M. P. 305° C. (decomp.).

The starting material used in the process of this example may be obtained as follows:

12.0 parts of 4:6-diaminoquinoline, 9.8 parts of 4-chloro-2-aminopyrimidine, and 38 parts of 7% aqueous hydrochloric acid are boiled together under reflux for 2 hours. Aqueous sodium hydroxide solution is then added until the mixture is alkaline to Clayton Yellow. It is then cooled, and the solid is filtered off and washed with water. It is then crystallised from aqueous methonal and 4-amino-6-(2'-amino-pyrimidyl-4'-amino)-quinoline monohydrate is obtained, M. P. 240–242° C.

9.5 parts of 4-amino-6-(2'-aminopyrimidyl-4'-amino)quinoline monohydrate, 95 parts of nitrobenzene and 50 parts of benzene are stirred and distilled at 170° C. for 3 hours, the distillate being free from water and returned to the mixture. The benzene is then distilled off, and the mixture is cooled to 90° C. 10.4 parts of dimethyl sulphate are added slowly at 90–95° C. and the mixture is stirred at 90–95° C. for 4 hours. It is then cooled and filtered and the solid is washed with acetone and crystallised from aqueous methanol. This product is dissolved in hot water, and an excess of sodium chloride is added. The solution is cooled and filtered and the solid is crystallised from 50% aqueous ethanol. There is obtained 4-amino-6-(2'-aminopyrimidly-4'-amino)quinoline 1:1'-dimethochloride trihydrate, M. P. 341° C. (decomp.).

I claim:

1. A process for the manufacture of quaternary salts selected from the group consisting of quaternary sulfates and sulfonates of pyrimidylaminoquinoline derivatives having the general formula:

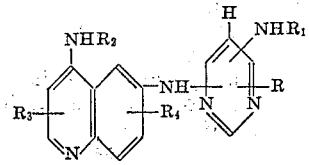

wherein R is a radical from the group consisting of hydrogen, amino, lower alkylamino and lower alkyl; $R_1$ and $R_2$ are radicals from the group consisting of hydrogen and lower alkyl; and $R_3$ and $R_4$ are radicals from the group consisting of hydrogen and lower alkyl, which comprises reacting a halogen acid quaternary salt of compounds having the general formula specified above with a quaternary salt-forming agent selected from the group consisting of lower alkyl esters of sulfuric acid and sulfonic acids.

2. A process as claimed in claim 1 wherein said salt-forming agent is a lower alkyl ester of sulphuric acid.

3. A process as claimed in claim 1 wherein said salt-forming agent is a lower alkyl ester of a sulphonic acid.

4. A process as claimed in claim 1 wherein said reaction is carried out by heating the reactants together in an inert solvent.

CHARLES HENRY VASEY.

No references cited.